United States Patent [19]

Hamilius

[11] 3,929,638

[45] Dec. 30, 1975

[54] REMOVAL OF SLAG FROM A METALLURGICAL VESSEL

[75] Inventor: Albert Hamilius, Destelbergen, Belgium

[73] Assignee: Centre de Recherches Metallurgiques— Centrum voor Research in de Metallurgie, Brussels, Belgium

[22] Filed: Aug. 20, 1974

[21] Appl. No.: 498,939

[30] Foreign Application Priority Data

Aug. 22, 1973 Belgium .............................. 803921

[52] U.S. Cl. ...................... 210/65; 210/83; 210/527
[51] Int. Cl.² ......................................... B01D 21/04
[58] Field of Search .......... 210/65, 69, 523, 527, 83

[56] References Cited

UNITED STATES PATENTS

| | | | |
|---|---|---|---|
| 2,049,937 | 8/1936 | Alden et al. | 210/523 X |
| 2,195,344 | 3/1940 | Slaugenhon | 210/527 X |
| 3,348,690 | 10/1967 | Cornelissen | 210/523 X |

*Primary Examiner*—John Adee
*Attorney, Agent, or Firm*—Holman & Stern

[57] ABSTRACT

A method for removing slag from the surface of molten metal in a vessel by a scraper having two arms articulated together about a common axis is disclosed. As the scraper is moved across the surface of the metal, the angle between the arms is controlled, so that the maximum surface area is scraped while the slag is prevented from escaping laterally at the ends of the arms.

2 Claims, 6 Drawing Figures

REMOVAL OF SLAG FROM A METALLURGICAL VESSEL

BACKGROUND OF THE INVENTION

The present invention relates to a method for removing slag from a metallurgical vessel, particularly a ladle for molten metal or a steel converter.

In the majority of the stages of metallurgical processes for refining molten metal, a certain amount of slag, containing at least a part of the impurities removed from the metal, appears on the upper surface of the molten metal. It is thus necessary to carefully separate the metal and the slag floating on its surface, in order to prevent the impurities from returning to the metal and to prevent any subsequent treatment of the metal from being affected by the presence of the impurities contained in the slag.

If, for example, the refining of steel in a converter is considered, the above considerations are naturally interpreted as underlining the need to prevent a substantial amount of slag from being carried into the converter along with the pig iron to be refined, during filling of the converter.

Such slag may originate in the blast furnace; it is nearly always carried along with the liquid pig iron as the ladles are filled with this pig iron, often in quite a thick layer. The equivalent proportion of silica in this slag (often about 2kg of silicon per ton of pig iron) is such that its presence during desulphurization of the pig iron would make the slag too acid and thus counteract the basicity which is desirable for a good desulphurization. Furthermore from the point of view of the refining operation itself, it would be necessary to introduce an abnormally high amount of slagging material (for example lime) in order to fix the silica.

In the case where the pig iron to be poured into the converter passes through a mixer, the slag, more particularly that arising from the wear of the refractory lining of the mixer, would risk being carried along into the converter with this pig iron; this slag, which is equally harmful from the point of view of the metal to be refined, must definitely not penetrate into the converter and must be removed by a suitable method.

Furthermore when the molten pig iron is subjected to desulphurization in the ladle, for example by means of products such as soda, lime, and $CaC_2$, a slag is formed which floats on the surface of the metal; this slag may be liquid or powdery as the case may be and contains practically all the sulphur removed from the pig iron. It is absolutely imperative that this slag, which may contain several percent sulphur, be separated from the metal before refining, otherwise there would be the risk of contaminating the metal so that correct refining would become considerably more laborious than normal and might even make the production of certain grades of steel impossible.

Until now the floating slag has been separated from the pig iron by using mechanical means, for example metal or wooden scrapers, or pneumatic means, for example "rakes" whose teeth are jets of pressurized gas which force back the slag towards the pouring lip.

However these known means have one significant drawback: the width of the arms or rakes is necessarily limited and thus, owing to its fluidity, the slag escapes laterally at the two ends of the scouring tool as this tool is displaced over the surface of the metal towards the pouring lip.

Conventional practice has a further drawback in being very laborious for the operators, being extremely slow because it requires numerous journeys by the scraper over the surface of the bath, and remaining of uncertain efficiency. The length of this scouring operation not only causes a loss of time but also a drop in the temperature of the metal, which may be detrimental.

SUMMARY OF THE INVENTION

A slag scraper, for use according to the inventive method, comprises two (preferably rectilinear) scraping arms articulated together about a common axis, means for controlling the size of the angle between the two scraping arms, and means for moving the scraping arms across the surface of the metal bath to be de-slagged.

By the expression "controlling the size of the angle" is meant the possibility of modifying the size of this angle and the possibility of keeping the modified size of this angle constant for a desired time.

The two arms of the scraper are preferably of equal length.

Obviously, the arms may have scraping elements which are mechanical or pneumatic, and any structural details known at the present time relating to scrapers may be applied to the scraping arms.

The articulated scraper is placed on the metal bath at a point diametrically opposite to an outlet (such as a pouring lip), the axis of articulation being perpendicular to the surface of the bath, the angle between the two arms of the articulated scraper is adjusted so that the maximum surface area of the metallic bath can be scraped, the scraper thus adjusted is moved across the surface of the bath towards the outlet, and the opening angle of the scraper is modified as a function of the variation of the remaining surface area to be scraped and in order to prevent the slag from escaping laterally at the ends of the two arms of the scraper.

The opening angle of the two arms of the scraper is preferably reduced severely at least once at certain select moments during the de-slagging operation, for example at the beginning, half way, and at the end of the displacement of the scraper, so as to propel the slag contained between the arms of the scraper in the direction of the outlet.

By means of the articulated scraper a large amount of slag can be separated from the metal bath on each displacement of the scraper, thereby considerably reducing the time of the de-slagging operation.

BRIEF DESCRIPTION OF THE DRAWINGS

The inventive method will be described further, by way of example only, with reference to the accompanying drawings, in which.

DETAILED DESCRIPTION OF THE INVENTION

Figure 1A:
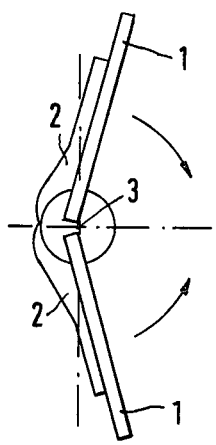
FIGS. 1a, 1b and 1c show three plan views of the articulated arms of a slag scraper, respectively fully open, and closed.
Figure 1B:
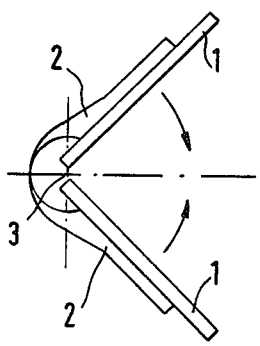
Figure 1C:
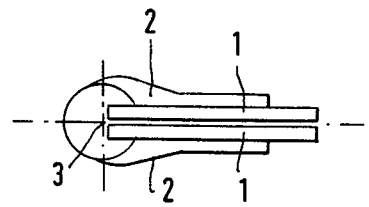

The drawings illustrate a converter containing molten metal 6 on which floats a layer of slag 7 which is to be removed by a scraper having two arms 2 of equal length. The arms 2 are articulated together about a common vertical axis 3 and they each have a vertical scraping plate 1. FIGS. 1a–c show three possible positions of the arms 2: the open position (FIG. 1a) is generally used at the beginning of de-slagging; the closed position (FIG. 1c) is generally used at the end of de-slagging.

Figure 2:
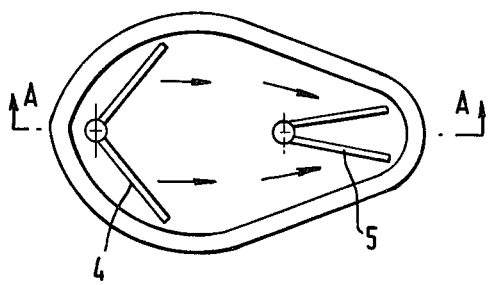
FIG. 2 is a plan view of a tilted converter showing the scraping arms of FIGS. 1a–c in two portions.
Figure 4:
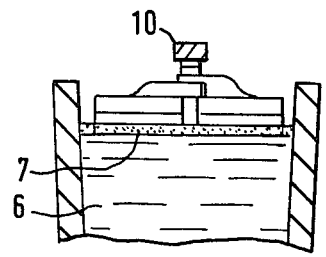
FIG. 4 is a section along line B—B of FIG. 3.

FIG. 2 shows two positions 4, 5 of the arms of the scraper, which is moved from left to right (as seen in the drawing) across the slag layer towards the pouring lip of the converter, as indicated by the arrows. At the beginning of de-slagging (position 4) the arms are open as much as possible. At the end of de-slagging (position 5) the arms are nearing the closed position.

Figure 3:
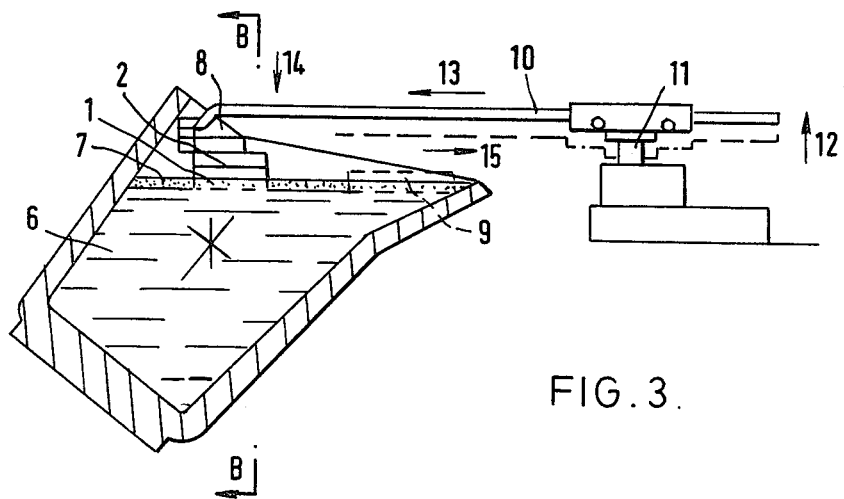
FIG. 3 is a section along line A—A of FIG. 2.

FIG. 3 shows a converter full of metal 6 covered with slag 7, and the scraper placed in the slag at the beginning (position 8) and at the end (position 9) of a de-slagging operation.

The scraper comprises the scraping plates 1, the arms 2, a longitudinally movable rod 10, and means 11 such as a hydraulic jack for moving the scraping plates 1 into and out of the slag layer in the converter.

The four arrows 12, 13, 14 and 15 indicate the complete sequence of movement of the scraper. At first with the scraping plates 1 outside the converter, the rod 10 is moved upwards (arrow 12) and then towards the inside of the converter (arrow 13). At the end of this movement the scraper is ready to work and the rod 10 is moved downwards (arrow 14) until the scraping plates 1 enter the slag 7.

During de-slagging the rod 10, together with the scraping plates 1, is moved towards the lip of the converter (arrow 15) while the arms 2 are progressively closed. At the end of this movement (position 9) the de-slagging is finished and the scraper is ready for a new operation.

I claim:
1. A method of removing slag from the surface of molten metal in a vessel having an outlet, by means of a scraper which comprises two scraping arms articulated together about a common axis, the method comprising the sequential steps of placing the scraper on the metal at a point diametrically opposite the outlet, with the common axis of articulation perpendicular to the surface, adjusting the angle between the arms so that the maximum area of the surface may be scraped, and moving the scraper across the surface towards the outlet and modifying the angle between the arms according to the remaining surface area to be scraped, so as to prevent slag from escaping laterally at the ends of the arms.

2. The method as claimed in claim 1, further comprising the step of severely reducing the angle between the arms at least once during scraping so as to propel the slag between the arms towards the outlet.

* * * * *